United States Patent
Perkins et al.

(10) Patent No.: US 7,238,882 B2
(45) Date of Patent: Jul. 3, 2007

(54) LOW VOLTAGE DOOR SWITCH

(75) Inventors: Charles B. Perkins, 105 Oak Ridge Dr., Sharpsburg, GA (US) 30277; David R. Mewbourne, Knoxville, TN (US)

(73) Assignee: Charles B. Perkins, Sharpsburg, GA (US)

( * ) Notice: Subject to any disclaimer, the term of this patent is extended or adjusted under 35 U.S.C. 154(b) by 425 days.

(21) Appl. No.: 10/760,615

(22) Filed: Jan. 20, 2004

(65) Prior Publication Data

US 2005/0155784 A1 Jul. 21, 2005

(51) Int. Cl.
*H02G 3/00* (2006.01)

(52) U.S. Cl. .................. 174/66; 439/532; 439/535; 439/536

(58) Field of Classification Search .......... 174/66, 174/480; 439/532, 535, 536; 361/732
See application file for complete search history.

(56) References Cited

U.S. PATENT DOCUMENTS

| | | | |
|---|---|---|---|
| 2,096,503 A * | 10/1937 | Allread | 200/61.82 |
| 3,371,149 A | 2/1968 | Maxted | |
| 3,472,945 A | 10/1969 | Trachtenberg | |
| RE32,450 E | 6/1987 | Blake | |
| 5,191,265 A | 3/1993 | D'Aleo et al. | |
| 5,445,539 A | 8/1995 | Dale | |
| 5,595,495 A | 1/1997 | Johnson et al. | |
| 5,608,196 A * | 3/1997 | Hall et al. | 200/61.19 |
| 6,483,031 B2 | 11/2002 | O'Donnell | |

OTHER PUBLICATIONS

Lutron Electronics Co., Inc., "HomeWorks HWV-1000NS," Installation Instructions, Nov. 1996, Coopersburg, PA.
LVS, "Technically advanced self contained low voltage switching devices," Engineering & Installation Manual, May 1994, San Leandro, CA.

* cited by examiner

*Primary Examiner*—Jinhee Lee
(74) *Attorney, Agent, or Firm*—Knox Patents; Thomas A Kulaga

(57) ABSTRACT

An apparatus for a residential low voltage control system. A low voltage controller is adapted to fit into a standard wiring box, and the controller provides isolation/separation of the low voltage wiring from other wiring. The face plate of the controller, in one embodiment, has a recessed portion with terminals for connecting the low voltage conductors. In another embodiment, the face plate has a recessed portion with an opening for a terminal block to protrude. In still another embodiment, the face plate has an opening for a low profile terminal block to protrude.

10 Claims, 4 Drawing Sheets

US 7,238,882 B2

LOW VOLTAGE DOOR SWITCH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an apparatus for low voltage control in a residential home. More particularly, this invention pertains to low voltage system with an isolation unit that is easy to install and meets voltage separation requirements.

2. Description of the Related Art

Home automation or management systems which permit increased control of at least some of the electrical subsystems in a dwelling have begun to replace or to supplement conventional wiring systems that operate at a high voltage (typically 120 volts in a residence). These automation systems use low voltage (typically less than 30 volts) circuits controlled by low voltage switches to control high voltage loads. Many home control systems and lighting control systems or subsystems are generally incompatible with conventional wiring techniques. One common complaint is that the additional wiring required for such systems results in a maze of additional wiring. The systems also tend to be relatively expensive. It is desirable, therefore, to have a wiring device that is compatible with existing wiring and requires only the addition of easy to install low voltage wiring during initial construction.

In accordance with the National Electric Code (NEC), electrical conductors including electric light, power, class 1, or non power-limited fire protection signaling conductors must be separated from electrical conductors including power-limited class 2 or class 3 conductors. The conductors of the one group cannot be in any cable, cable tray, compartment, enclosure, outlet box, raceway, or similar fitting with conductors from the other grou unless the conductors are separated by a barrier. Another exception is where conductors of one group are introduced solely to connect to equipment connected to conductors of the other group.

The NEC further requires that all joints, connections, and splices of electrical cables be made inside an approved enclosure and further must include tight connections with the conduit or cable. Conventional electrical boxes may be made from metal or plastic. The box is further designed with great flexibility so that wires can be brought in from any side by removing a "knock out" to receive a lug for mounting fixtures or the like.

U.S. Pat. Nos. 3,371,149; 3,472,945; 5,445,539; and 6,483,031 are representative of patents disclosing various devices that separate different classes of conductors. U.S. Pat. No. 3,371,149 discloses a metal barrier 26 in a wiring box 11 separating power 22 and television antenna 22a conductors. U.S. Pat. No. 3,472,945 discloses an outlet box 10 divided with a metal barrier plate or partition 15.

U.S. Pat. No. 5,445,539 discloses a wiring device 20 to which different classes of conductors are attached. The wiring device 20 is mounted in a conventional electrical box 84 and separation of the conductors is 25 achieved by routing the low voltage conductors 76 through a tubular projection 32, which extends through a knockout opening 86 in the box 84. The tubular projection 32 is attached to the housing 22 of the wiring device 20, thereby separating the low voltage conductors 76 from the power conductors 48, 80 in the electrical box 84.

U.S. Pat. No. 6,483,031 discloses an enclosure, or control module, 18 attached to an outlet box 58. The low voltage wiring 48 enters the enclosure 18 at the rear, directly from the wall space, and the power wiring 49 enters the outlet box 58, where it is routed to the other end of the enclosure 18, which connects the enclosure 18 to the outlet box 58.

Several problems are typically encountered in the use of low voltage control in a residential home. For example, the low voltage switches are typically push-button switches mounted in the door jamb adjacent a door hinge. Such an installation requires a mortise cut to install the switch, which is a time consuming operation. Also, many low voltage controllers require the use of custom components, such as electrical boxes and cover plates, instead of using standard, readily available components. Further, many low voltage controller installations require that the low voltage wiring be routed in a specific manner, thereby limiting the flexibility of the installer.

BRIEF SUMMARY OF THE INVENTION

According to one embodiment of the present invention, a low voltage control system for a residential home is provided. The system includes a controller that isolates the high voltage wiring from the low voltage wiring, a switch in the low voltage circuit, and an operated device in the high voltage circuit. In one embodiment, the controller fits into a standard box.

In one embodiment, the controller has a flat front panel with exposed terminals for the low voltage circuit. In another embodiment, the controller has a front panel with a recessed area in which the low voltage terminals are located. In still another embodiment, the controller has a low voltage terminal block with a low profile, in which the terminal block protrudes from an opening in the front panel.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for low voltage control in a residential environment is disclosed. The apparatus allows the installation of low voltage wiring for controlling lighting and other loads in a residence.

Figure 1:
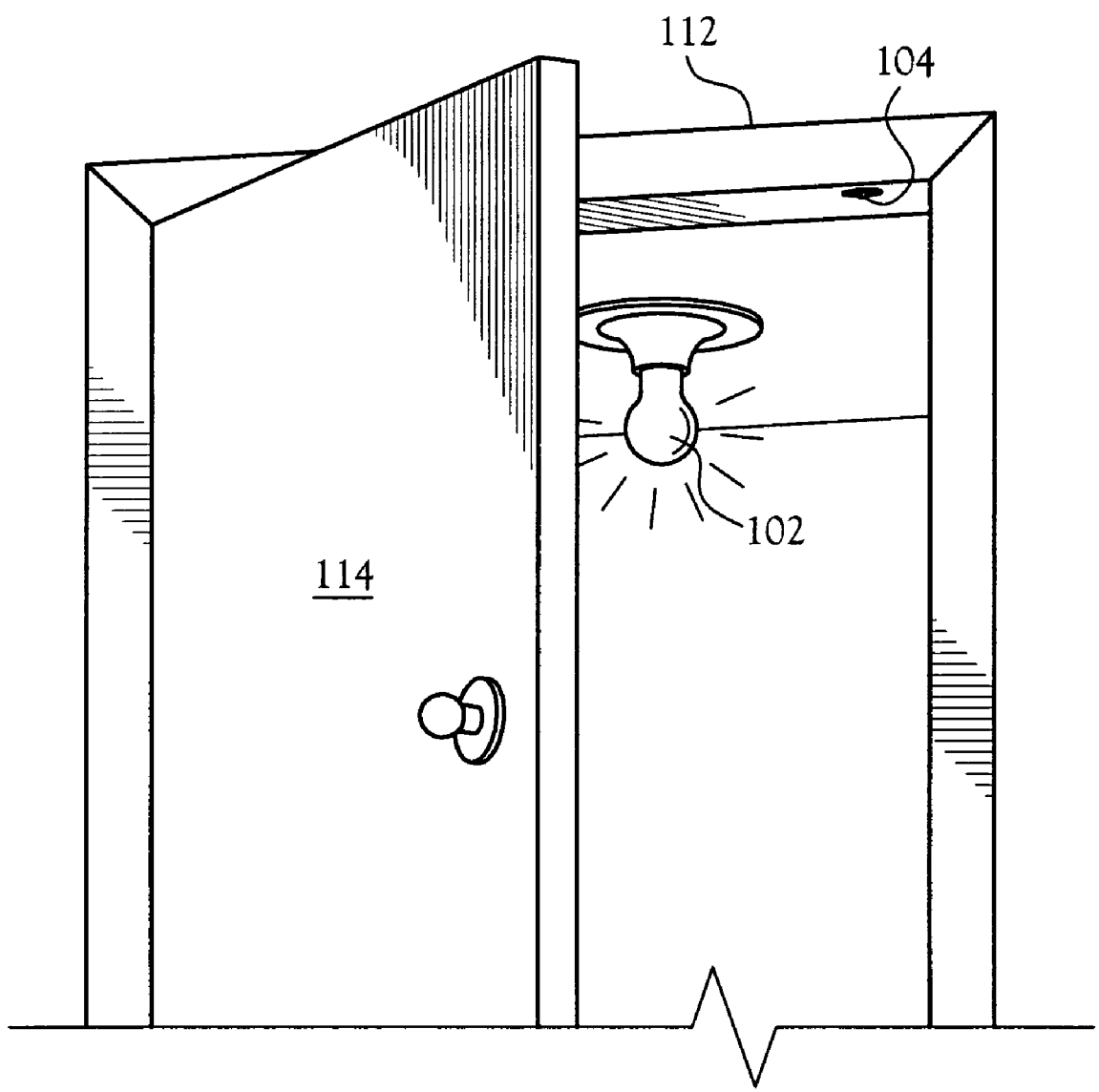
FIG. 1 is a perspective view of one embodiment of the system showing a closet door operating a switch and a lamp.

FIG. 1 illustrates one embodiment of the control system 10 in which a closet door 114 operates a switch 104. When the door 114 is closed, that is, the door 114 is seated in the frame 112, the switch 104 is actuated and the closet lamp 102 is not illuminated. When the door 114 is open, the switch 104 returns to a normal position and the lam 102 is illuminated.

Figure 2:
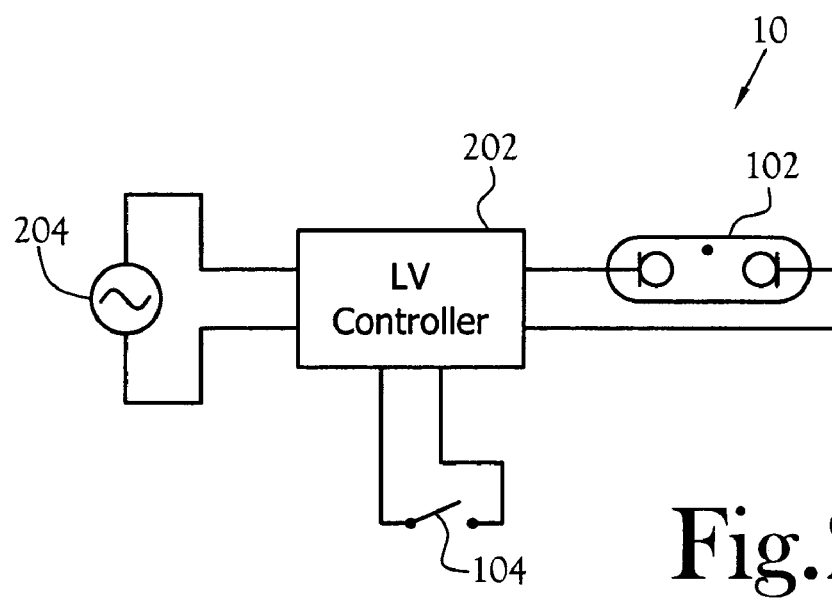
FIG. 2 is a schematic diagram of one embodiment of the system.

FIG. 2 illustrates a simplified schematic of one embodiment of the control system 10. A low voltage controller 202 is powered by a power, or high voltage, source 204, such as 120 volts alternating current. The controller 202 monitors a switch 104 and operates a driven device 102, such as a fluorescent lamp. The circuit of which the switch 104 is a part operates at a low voltage, for example, 6 to 18 volts. The driven device 102 is driven by the power, or high voltage, source 204. The controller 202 isolates the power voltage circuit, which includes the source 204 and the lamp 102, from the low voltage circuit connected to the switch 102.

Figure 3:
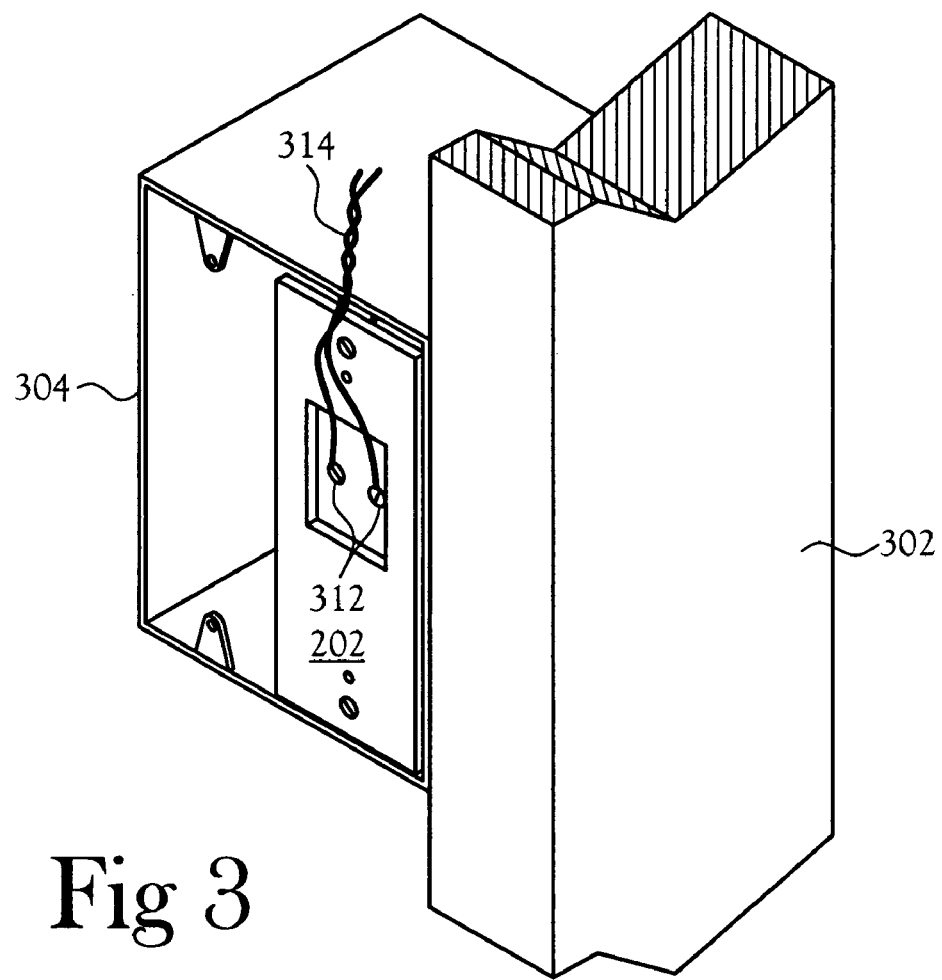
FIG. 3 is a perspective view of one embodiment of the controller mounted in a box attached to a stud.

FIG. 3 illustrates a standard wall wiring box 304 attached to a wall stud 302. In the illustrated embodiment, the box 304 is a double wide box, which is sized to accommodate two standard appliances, for example, two wall switches or two duplex receptacles. These boxes 304 are known in the art and are commonly available in either plastic or sheet metal. In the illustrated embodiment, the controller 202 is mounted in the electrical box 304. Those skilled in the art will recognize that the controller 202 can be adapted to be used with any standard type electrical box without departing from the spirit or scope of the present invention. The various types of boxes include those that are adapted to receive electrical equipment and have provisions for mounting such equipment inside the box. One example of such a box is an overhead box for mounting or receiving a lighting fixture.

Figure 4:
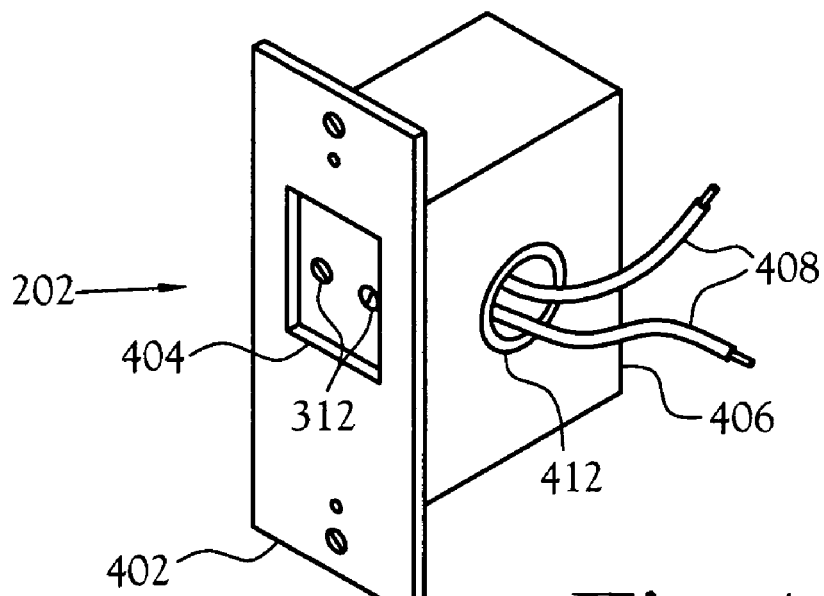
FIG. 4 is a perspective view of one embodiment of the controller.

FIG. 4 illustrates the embodiment of the controller 202 shown in FIG. 3. Inside the box 304 is one embodiment of a controller 202. The low voltage wiring 314 is connected to a pair of standard screw terminals 312 in a recessed area 404 on the face plate 402 of the controller 202. The power, or high voltage, wiring 408 exits through a grommet 412 in the enclosure, or controller module, 406, which contains the functional components of the controller 202. In another embodiment, the high voltage wiring 408 exits through an opening in the rear of the controller 202. Because the high voltage wiring 408 is behind the face plate 402 of the controller 202 and isolated from the low voltage wiring 314, which is routed through the opening between the box 304 and the wall-board, the controller 202 effectively isolates the power wiring 408 from the low voltage wiring 314. Those skilled in the art will recognize that the number of power conductors 408 varies depending upon the application and type of controller.

The face plate 402 of the controller 202 is positioned such that the face plate 402 is adjacent to and substantially parallel to the major opening of the electrical box 304. In this manner, the low voltage wiring 314 is routed over the face plate 402 and directly out of the box 304, and the high voltage wiring 408 is routed through the box 304 and out a cut-out in the box 304.

In one embodiment, the box 304 with the controller 202 is mounted inside a closet with a blank cover over the opening to the box 304. The low voltage wiring 314 is routed through the walls to the switch 104. Because the low voltage wiring 314 is Class 2 wiring, the wiring 314 can be twisted pair conductors routed without conduit. The low voltage wiring is routed from the terminals 404, over the face plate 402, and between the electrical box 304 and the wall board (not illustrated) to the switch 104.

Figure 5:
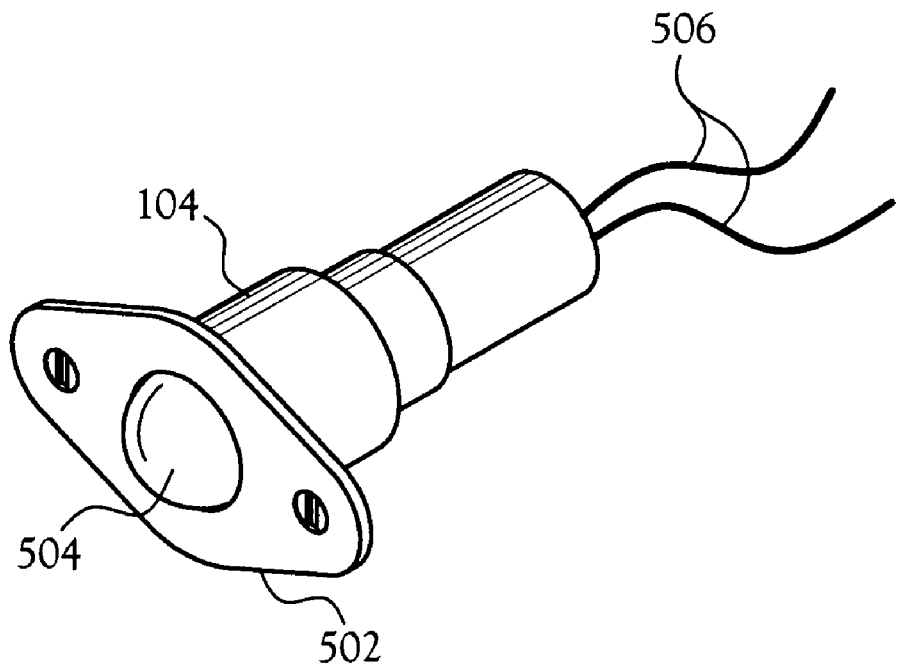
FIG. 5 is a perspective view of one embodiment of a low voltage switch.

FIG. 5 illustrates one embodiment of a low voltage switch 104. The switch 104 is a ball switch, that is, the switch operator is a ball 504 that protrudes beyond a mounting plate 502. When the ball 504 is pushed into the body of the switch 104, the switch 104 changes state. Such a switch 104 is suitable for mounting in a location other than the door jamb adjacent the door hinges. That is, such a switch 104 is suitable for being actuated by a door moving laterally across a surface on which the switch 104 is mounted.

In one embodiment, the switch 104 is mounted in the upper portion of a door frame 112 such that when the door 114 is closed, the ball 504 is operated, thereby actuating the switch 104 and causing the controller 202 to block power to the driven device 102. In another embodiment, the switch 104 is mounted at another location on the door frame. When the door 114 opens and releases the ball 504 to its normal position, the switch 104 causes the controller 202 to provide power to the driven device 102. The switch 104 fits into the gap between the door 114 and the door frame 114 without requiring extensive work to fit the switch 104 without interfering with the door 114 closing. An advantage to locating the ball switch 104 away from the jamb adjacent the door hinges is that the switch 104 can be installed without a mortise cut.

Figure 6:
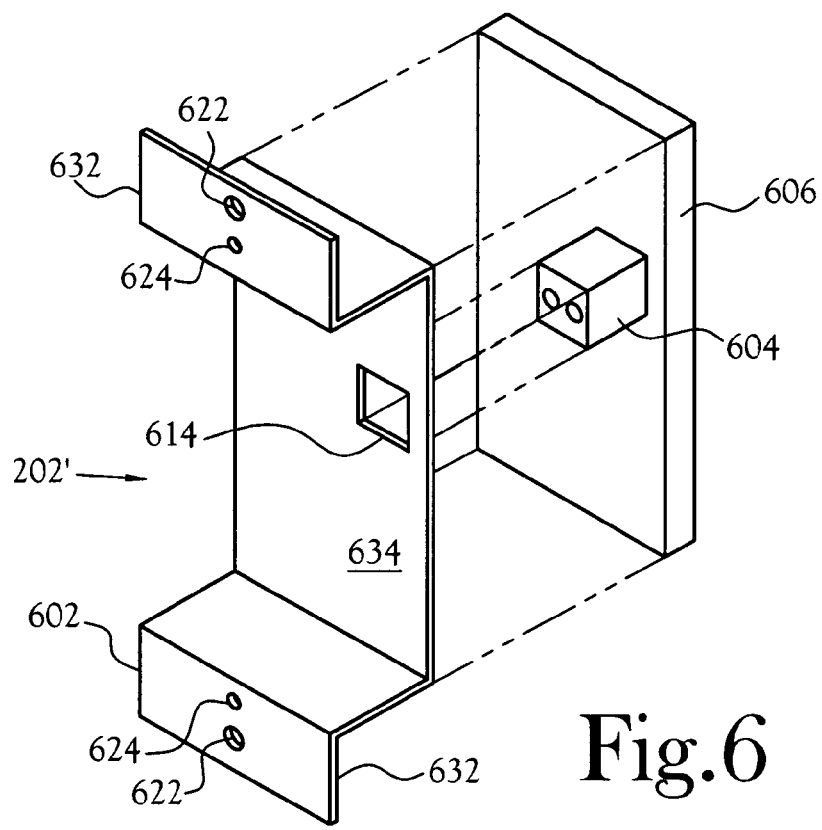
FIG. 6 is an exploded view of another embodiment of the controller.

FIG. 6 illustrates another embodiment of a controller 202' having a face plate 602. The face plate 602 has two mounting portions 632 and a recessed portion 634. The mounting portions 632 are located at opposite ends of the recessed portion 634 and include openings 622 for securing the face plate 602 to the box 304 and a second set of openings 624 for securing a cover plate over the opening of the box 304, thereby protecting the controller 202' and providing a cosmetically pleasing appearance.

The illustrated embodiment shows a circuit board 606, which contains the sensing and switching components for the controller 202. In another embodiment, an enclosure replaces the illustrated circuit board 606. The circuit board 606 has a terminal block 604 that protrudes above the surface the circuit board 606 and fits into an opening 614 in the recessed portion 634 of the face plate 602. The terminal block 604 protrudes past the surface of the recessed portion 634 sufficiently for the low voltage wiring 314 to connect to the terminal block 604, and the recessed portion 634 is offset from the plane of the mounting portions 632 sufficiently for the low voltage wiring 314 to be routed out of the box 304 and isolated from the high voltage wiring 408 without interfering with a cover plate. The power wiring 408 connects to the circuit board 606 at a side other than the side with the terminal block 604, thereby maintaining separation from the low voltage wiring 314.

Figure 7:
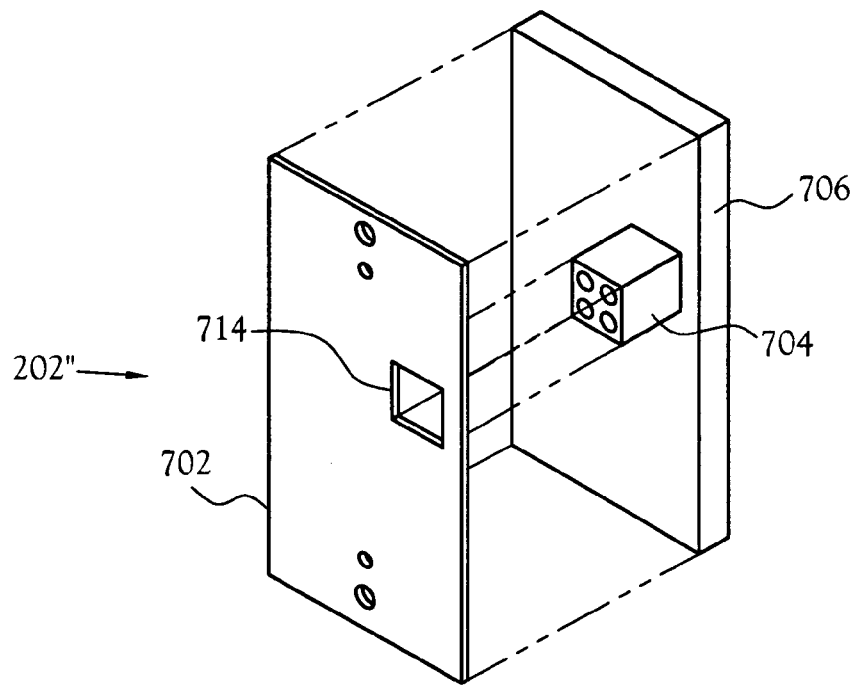
FIG. 7 is an exploded view of another embodiment of the controller.

FIG. 7 illustrates still embodiment of a controller 202" having a face plate 702 and an opening 714 for receiving a terminal block 704. The faceplate 702 in this embodiment is flat and the circuit board 706 is adapted to connect to the face plate 702 with a terminal block 704 protruding through the opening 714 in the face plate 702. In another embodiment, an enclosure replaces the illustrated circuit board 706. The terminal block 704, in the illustrated embodiment, has means for securing the low voltage wiring 314 that are accessible from the front of the face plate 702 with the terminal block 704 having a lowprofile, less than ⅛ inch, above the face plate 702. Such a terminal block 704 maintains a low profile above the front surface of the face plate 702, thereby allowing the low voltage wiring 314 to be routed along the face plate 702 and outside the electrical box 304.

In another embodiment, a controller module replaces the circuit board 606, 706. The module contains the sensing and switching components for the controller 202', 202". The terminal block 604, 704 protrudes from the module and fits into the opening 614, 714 in the face place 602, 702. In still another embodiment, the circuit board 606, 706 is contained in an enclosure, is potted, or otherwise is protected from casual contact with any energized components.

In one embodiment, the controller 202, 202', 202" fits into a conventional electrical box 304 and accepts a conventional cover to hide the installation of the controller, thereby allowing use with conventional and readily available components. The location of the terminal block 312, 604, 704 is such that the low voltage wiring 314 can be easily routed in a manner that is convenient to install while still maintaining separation from the high voltage wiring 408.

The low voltage control system 10 includes various functions. The function of securing a controller in an electrical box is implemented in various embodiments by the shape and configuration of the controller 202, 202', 202" including the mounting holes 622 in the face plate 402, 602, 702. The function of terminating a plurality of low voltage conductors 314 to the controller 202 is implemented, in one embodiment, by the screw terminals 312, and in other embodiments, by the terminal blocks 604, 704.

The function of isolating the plurality of low voltage conductors 314 from a plurality of power conductors 408 in the electrical box 304 is implemented, in one embodiment, by the screw terminals 312 located in a recess 404 with the power conductors 408 located on the opposite side of the face plate 402 from the screw terminals 312. In another embodiment, the isolation is implemented by the terminal block 604 protruding through an opening, or aperture, 614 in a recessed portion 634 of the face plate 602 with the power conductors 408 located on the opposite side of the face plate 602 from the accessible portion of the terminal block 604. In still another embodiment, the isolation is implemented by the low profile terminal block 704 protruding through an opening, or aperture, 714 in the face plate 702 with the power conductors 408 located on the opposite side of the face plate 702 from the accessible portion of the terminal block 704.

From the foregoing description, it will be recognized by those skilled in the art that a low voltage control system has been provided. A low voltage controller is adapted to fit into a standard wiring box, and the controller provides isolation/separation of the low voltage wiring from other wiring. In one embodiment, the low voltage wiring is terminated at a recessed terminal block. In another embodiment, the face plate of the controller has a recessed area with a terminal block protruding through an opening, thereby isolating the low voltage wiring from the other wiring. In still another embodiment, the face plate has an opening through which a low profile terminal block protrudes, thereby providing isolation.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for a residential low voltage control system operated by a door, said apparatus comprising:
    a controlled device;
    a switch actuated by the door, said switch having a ball actuator;
    an electrical box containing a plurality of power conductors, at least one of said plurality of power conductors connected to said controlled device; and
    a controller having a face plate and a low voltage terminal block, said controller mounted in said electrical box with said face plate located adjacent to and parallel to a major opening of said electrical box, said face plate configured to secure a cover plate to said face plate, said controller connected to a circuit including said plurality of power conductors wherein said controller controls the operation of said controlled device, said controller outputting a low voltage signal to said switch through said low voltage terminal block, said low voltage terminal block having a plurality of terminals accessible from a front side of said face plate, said low voltage terminal block configured to route a plurality of low voltage conductors from said plurality of terminals out of said electrical box while maintaining separation from said plurality of power conductors inside said electrical box.

2. The apparatus of claim 1 wherein said face plate has a recessed portion in which said low voltage terminal block is accessible from said front side.

3. The apparatus of claim 1 wherein said face plate has a recessed portion and a pair of mounting portions, said low voltage terminal block received in an aperture in said recessed portion, said pair of mounting portions adapted to secure said face plate to said electrical box, said pair of mounting portions adapted to secure a cover plate to said face plate.

4. The apparatus of claim 1 wherein said face plate has a substantially flat surface, said low voltage terminal block received in an aperture in said substantially flat surface.

5. The apparatus of claim 1 wherein said switch is mounted in a upper horizontal frame member of the door wherein a top surface of said door actuates said ball actuator when the door is in a closed position.

6. A controller for a residential low voltage control system, said controller adapted to be received by an electrical box, said controller comprising:
    a face plate having a front side and a back side, said face plate adapted to secure said face plate to the electrical box, said face plate adapted to secure a cover plate to said face plate;
    a module for controlling a driven device, said module secured to said back side of said face plate, said module having power connections; and
    a terminal block accessible from a front side of said face plate for making a plurality of low voltage terminations, said terminal block electrically connected to said module for communicating at least one low voltage control signal, said terminal block having terminations that releasably connect conductor,
    said terminal block configured to route a plurality of low voltage conductors from said terminal block out of the electrical box while maintaining separation from said power connections inside said electrical box.

7. The controller of claim 6 wherein said face plate has a recessed portion in which said low voltage terminal block is accessible from said front side.

8. The controller of claim 6 wherein said face plate has a recessed portion and a pair of mounting portions, said low voltage terminal block received in an aperture in said recessed portion, said pair of mounting portions adapted to secure said face plate to said electrical box, said pair of mounting portions adapted to secure a cover plate to said face plate.

9. The controller of claim 6 wherein said face plate has a substantially flat surface, said low voltage terminal block received in an aperture in said substantially flat surface.

10. The controller of claim 6 wherein said face plate has a substantially flat surface, said low voltage terminal block received in an aperture in said substantially flat surface, said low voltage terminal block having a low profile.

* * * * *